(12) United States Patent
Huseynov et al.

(10) Patent No.: US 9,995,647 B2
(45) Date of Patent: *Jun. 12, 2018

(54) ULTRASONIC GAS LEAK LOCATION SYSTEM AND METHOD

(71) Applicant: General Monitors, Inc., Lake Forest, CA (US)

(72) Inventors: Javid J. Huseynov, Fountain Valley, CA (US); Shankar B. Baliga, Irvine, CA (US)

(73) Assignee: General Monitors, Inc., Lake Forest, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/871,468

(22) Filed: Sep. 30, 2015

(65) Prior Publication Data

US 2017/0089800 A1 Mar. 30, 2017

(51) Int. Cl.
*G01M 3/24* (2006.01)
*G01S 5/20* (2006.01)

(52) U.S. Cl.
CPC .................. *G01M 3/24* (2013.01); *G01S 5/20* (2013.01)

(58) Field of Classification Search
CPC ........................................................ G01S 5/20
USPC ...................................... 73/40.5 A
See application file for complete search history.

(56) References Cited

U.S. PATENT DOCUMENTS

| | | | |
|---|---|---|---|
| 3,895,340 A | 7/1975 | Gilmour | |
| 5,417,113 A | 5/1995 | Hartley | |
| 7,202,794 B2 | 4/2007 | Huseynov et al. | |
| 8,638,362 B1 | 1/2014 | Thompson et al. | |
| 8,792,658 B2 | 7/2014 | Baliga et al. | |
| 8,955,383 B2 | 2/2015 | Huseynov et al. | |
| 2006/0098534 A1* | 5/2006 | Hickling | G01S 5/20 367/124 |
| 2009/0060246 A1 | 3/2009 | Baliga et al. | |

(Continued)

FOREIGN PATENT DOCUMENTS

| | | |
|---|---|---|
| EP | 1371962 A1 | 12/2003 |
| JP | H1151300 A | 2/1999 |

(Continued)

OTHER PUBLICATIONS

Huseynov, Javi D. Distributed Localization of Ultrasonic SOurces of Gas Leak. Dissertaion, University of California, Irvine, 2008.*

(Continued)

*Primary Examiner* — Daniel S Larkin
*Assistant Examiner* — Nathaniel Kolb
(74) *Attorney, Agent, or Firm* — Larry K. Roberts

(57) ABSTRACT

An ultrasonic gas leak detector system for locating a source of ultrasonic airborne energy is described. An exemplary embodiment includes a plurality of spatially separated ultrasonic gas leak detectors, each configured to generate signals indicative of detected angles of arrival of received ultrasonic energy at the respective detectors. A locator processor receives the signals generated by the detectors, and is configured to process the signals to determine a location in three dimensions of the source of the ultrasonic energy received at the detectors and provide locator processor output signals indicative of the location.

18 Claims, 16 Drawing Sheets

(56) References Cited

U.S. PATENT DOCUMENTS

| | | | | |
|---|---|---|---|---|
| 2011/0120209 A1* | 5/2011 | Rose | ............ | G01M 3/243 |
| | | | | 73/1.82 |
| 2014/0000347 A1* | 1/2014 | Huseynov | ............ | G01M 3/24 |
| | | | | 73/40.5 A |
| 2014/0241548 A1 | 8/2014 | Kim et al. | | |
| 2015/0177403 A1* | 6/2015 | Haugen | ............ | G01V 1/40 |
| | | | | 73/152.47 |

FOREIGN PATENT DOCUMENTS

| | | |
|---|---|---|
| JP | 2006 266767 A | 10/2006 |
| WO | WO 2010007435 A2 | 1/2010 |

OTHER PUBLICATIONS

Huseynov, Javid, et al., Gas-Leak Localization Using Distributed Ultrasonic Sensors, Smart Sensor Phenomena, Technology, Networks, and Systems 2009, edited by Norbert G. Meyendorf, Kara J. Peters, Wolfgang Ecke, Proc. of SPIE vol. 7293, 72930Z-1.

Huseynov, Javid, Distributed Localization of Ultrasonic Sources of Gas Leak, Dissertation, University of California, Irvine, 2008.

Naranjo, et al., "Expanding the Use of Ultrasonic Gas Leak Detectors: A Review of Gas Release Characteristics for Adequate Detection," Gases & Instrumentation, Nov./Dec. 2009, pp. 24-29.

Application Note, Norsonic, "Acoustic camera and beampattern," 2014.

Roufarshbaf Hossein et al: Sub-optimum fast Bayesian techniques for joint leak detection and localisation, IET Wireless Sensor Systems, The Institution of Engineering and Technology, Michael Faraday House, Six Hills Way, Stevenage, Herts. SG1 2AY, UK, vol. 3, No. 3, Sep. 1, 2013 (Sep. 1, 2013), pp. 239-246.

Xu Bian et al: A New Method of Using Sensor Arrays for Gas Leakage Location Based on Correlation of the Time-Space Domain of Continuous Ultrasound, Sensors, vol. 15, No. 4, Apr. 9, 2015 (Apr. 9, 2015), pp. 8266-8283.

Javid Huseynov et al: Gas-Leak Localization Using Distributed Ultrasonic Sensors, Optomechanic Micro/Nano Devices and Components III : Oct. 8-10, 2007, Lausanne, Switzerland, vol. 7293, Mar. 26, 2009 (Mar. 26, 2009), pp. 72930Z.

International Search Report and Written Opinion of the International Searching Authority, PCT application PCT/US2016/052000, dated Jan. 4, 2017.

* cited by examiner

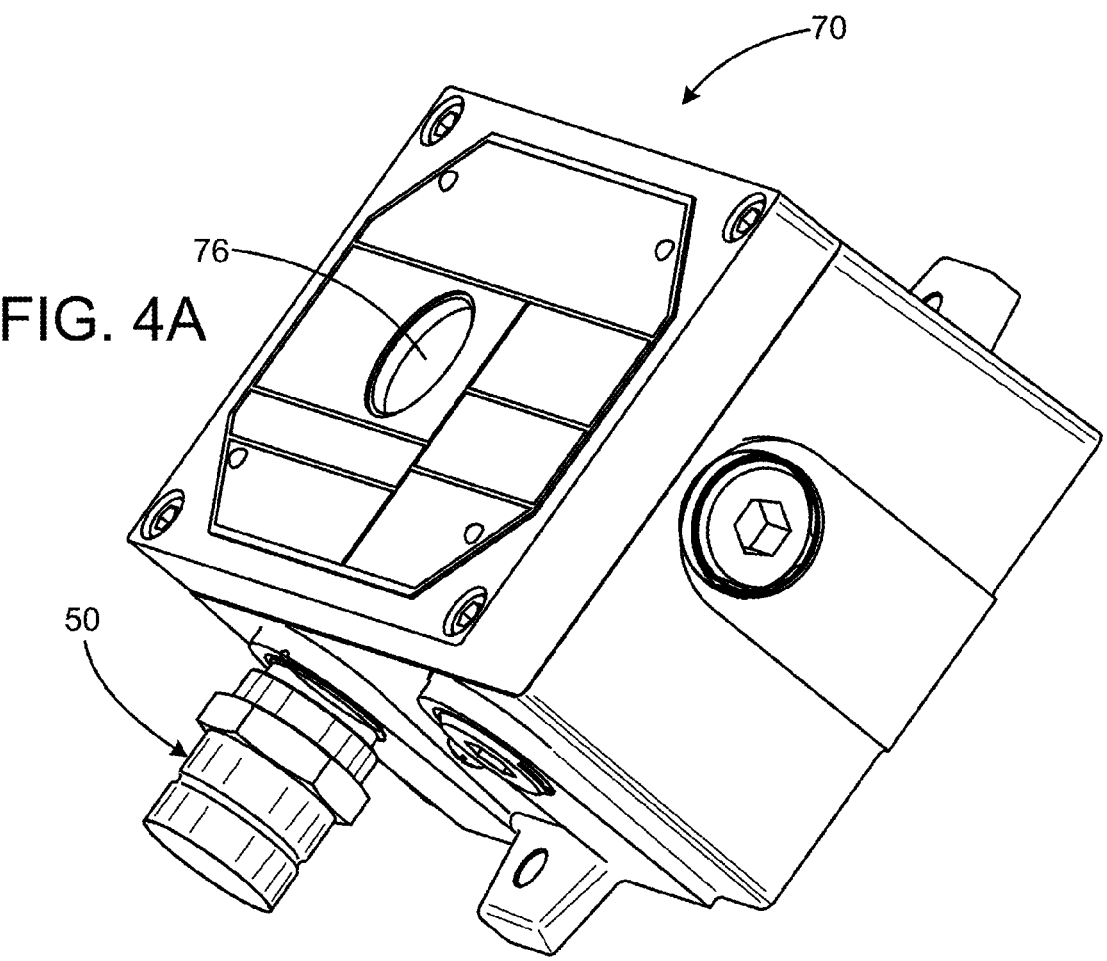

ULTRASONIC GAS LEAK LOCATION SYSTEM AND METHOD

BACKGROUND

Ultrasonic gas leak detectors measure the sound pressure waves generated by turbulent flow when gas escapes from higher pressures to the ambient atmosphere. Such gas leak detectors are used as industrial safety devices to monitor the unwanted or unexpected release of combustible or toxic gases into the atmosphere. The leaks need to be identified quickly before they grow further in magnitude, to allow for timely remedial action. Ultrasonic gas leak detectors have the advantage over other gas detector types in that gas does not need to reach the detector; gas leaks can be detected even if the leaking gas is dispersed by wind.

Conventional ultrasonic gas leak detectors are omnidirectional and while providing useful information about the size and duration of a pressurized gas leak do not provide any information about the location of the gas leak. Optical open path detectors, which are line of sight optical detectors, also do not provide leak location information. Conventional point detectors, such as catalytic, infrared or electrochemical, need to be placed in close proximity to each other at added expense to provide for more precise leak location information. Infrared gas cloud imaging cameras are expensive, their sensitivity varies greatly with the gas being monitored, and their performance depends greatly on the differential between the leaking gas cloud and background temperature. For such reasons infrared gas cloud imaging cameras are not being readily adopted in industrial fixed gas detection installations. A need therefore exists to add the benefits of leak location to gas leak detection equipment in a practical manner.

SUMMARY

An embodiment of a directional ultrasonic gas leak detector includes a plurality of detectors, each including an array of spaced MEMS microphones. Each microphone is responsive to incident airborne ultrasonic energy from gas leak sources to generate a microphone signal. A beamforming processor for each array is responsive to the microphone signals from the array to generate processor output signals indicative of estimated angles of arrival of ultrasonic energy incident on the array. The array may be disposed in an explosion proof housing structure, or implemented as an intrinsically safe device for operation in a hazardous location. The detectors are arranged in a spatially separated configuration to surveil an area containing pressurized gas storage or transportation, with a locator processor configured to triangulate the position of a pressurized gas leak. In another embodiment, a display is responsive to the processor output signals to generate an image representative of a surveilled scene with the calculated position of the pressurized gas leak overlaid onto the image.

BRIEF DESCRIPTION OF THE DRAWINGS

Features and advantages of the invention will readily be appreciated by persons skilled in the art from the following detailed description when read in conjunction with the drawings wherein:

FIG. 4A illustrates an exemplary housing structure for a microphone array gas leak detector.

DETAILED DESCRIPTION

Figure 1:
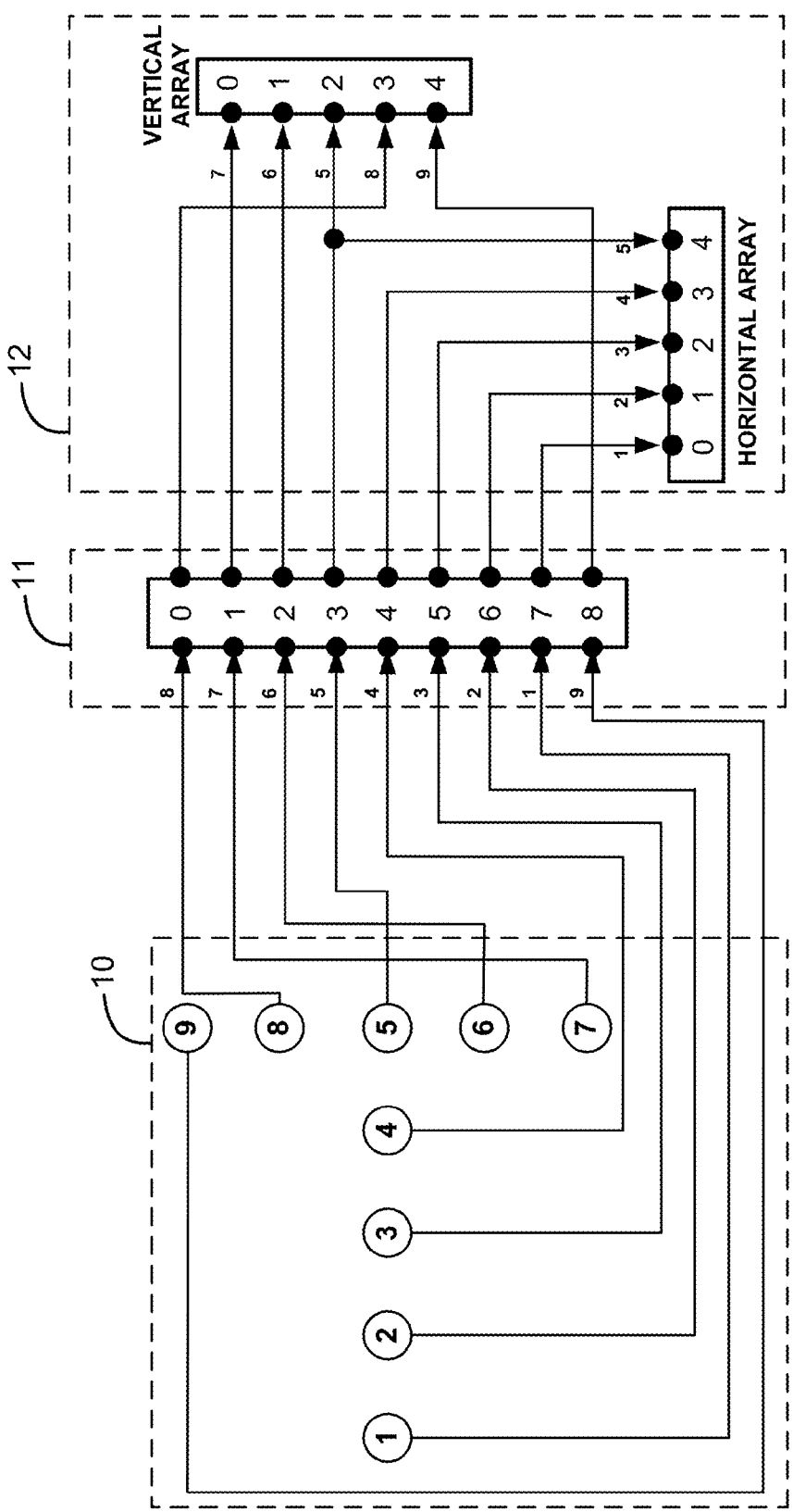
FIG. 1 is a schematic block diagram of an exemplary embodiment of a 2-dimensional array of MEMS microphones and associated electronics.

In the following detailed description and in the several figures of the drawing, like elements are identified with like reference numerals. The figures are not to scale, and relative feature sizes may be exaggerated for illustrative purposes.

Ultrasonic gas leak detectors on the market may utilize a single pre-polarized pressure microphone, such as manufactured by G.R.A.S. Sound and Vibration of Nolte, Denmark, Microtech Gefell GmbH of Gefell, Germany, or Bruel Kjaer of Naerum, Denmark. The ultrasonic region is defined as a frequency range beyond human hearing, starting at approximately 20 kHz in healthy, young human adults. Higher ultrasonic frequencies are attenuated more rapidly in air than lower frequencies, and the practical applications for an ultrasonic gas leak detection system are typically for frequencies less than 100 kHz.

In an exemplary embodiment, a directional ultrasonic gas leak detector includes an array of spaced microphones. Each microphone is responsive to incident airborne broadband ultrasonic energy from gas leak sources disposed within range of the array to generate a microphone signal. A beamforming processor is responsive to the microphone signals from the array to generate processor output signals indicative of estimated angles of arrival of ultrasonic energy incident on the array, from gas leak sources disposed within range of the array, e.g. within 30 meters to 50 meters from the array. The array may be housed in an explosion proof housing structure, or the detector may be designed to be an intrinsically safe device, to meet the requirements for operation in a hazardous location as defined by governing agency bodies. A hazardous location, in this context, is an area that contains or is likely to contain an ignitable concentration of flammable gas, vapor, or dust. The microphones are preferably spaced from adjacent microphones in the array by a spacing distance no larger than 5 mm.

In an exemplary embodiment, the ultrasonic microphone utilized in the array may be a miniature microphone based on MEMS (Micro Electro Mechanical Systems) technology that can be operated well beyond the audible range of 15 kHz and into the ultrasonic frequency range out to 100 kHz. The MEMS microphones may be mounted on a printed circuit board (PCB) and housed in an environmentally robust mechanical enclosure approved for use in hazardous locations, which permits passage of ultrasonic sound energy to the sensing element. U.S. Pat. No. 8,792,658 issued Jul. 29, 2015 details the implementation of such MEMS microphones in industrial ultrasonic gas leak detectors, and the entire contents of this patent is herein incorporated by reference.

Discrete, pre-polarized stainless steel ultrasonic microphones provide for excellent ultrasonic performance but are much too large and expensive to be packaged into arrays for an industrial gas leak detector. MEMS microphones are miniature in comparison and lend themselves to be placed on a circuit board to form microphone arrays. In an exemplary embodiment, a 2-dimensional array of a total of nine MEMS microphones (1-9) is spaced uniformly and equally in two sets of five linear arrays intersecting and in perpendicular directions on a circuit board 10 (FIG. 1). In order to achieve uniform and equal spacing in both perpendicular directions, the array is positioned in the shape of a "T": this is dictated by the MEMS microphone package being rectangular rather than square or circular. In an exemplary embodiment for ultrasonic detection of gas leaks, the microphone array area on the circuit board will typically not exceed 10 square cm. The signals generated by the microphones are digitized by ADC 11 and processed by a processor with embedded software, generally indicated as 12. For microphones that produce a digital output, the processor may process such digital signals without the need for ADC 11.

Figure 2:
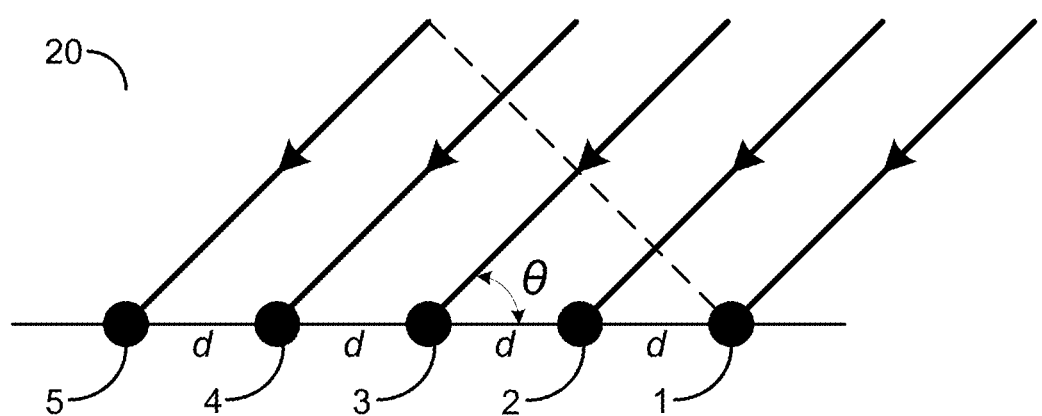
FIG. 2 is an illustration of a linear array of MEMS microphones with sound incident at an angle $\theta$ to the microphone array axis.

In an exemplary embodiment, N omnidirectional MEMS microphones are uniformly spaced in a line where N is at least 2. FIG. 2 is an illustration of a linear array 20 of five MEMS microphones (1, 2, 3, 4, and 5) with inter-microphone spacing d and with sound incident at an angle θ to the microphone array axis. Beamforming is a signal processing technique used in sensor arrays for directional signal transmission or reception, the latter being the case with microphones. A few of the rules that apply to beamforming with a uniform linear array (ULA) are:

a) An increase in the number of microphones can enhance the signal to noise ratio of an array, defined as array gain, and under conditions of coherent signal and incoherent noise given in (dB) by 10 log(N) where N is the number of microphones. Array gain can help with increased detection distance. Increasing N also results in a physically larger array.

b) Increasing the overall array length D with a larger number of microphones improves the spatial resolution. D is known as the aperture size, and in the case in which N microphones are equally spaced by a distance d, D=(N−1)d. For the broadside direction, the half power beamwidth is proportional to λ/D, where λ is the wavelength of the incident energy, and hence, a function of wavelength.

c) The inter-microphone spacing d determines the highest frequency $f_{max}$ that can be steered without effects of aliasing. The acoustic wavelength for the highest frequency $f_{max}$ is the shortest wavelength $\lambda_{min}$, and microphone spacing d must satisfy the criteria d<$\lambda_{min}$/2 to prevent spatial aliasing. For a speed of sound in air of 340 m/sec and microphone spacing d=3.4 mm, $\lambda_{min}$ is 6.8 mm and $f_{max}$=50 kHz; such a beamformer can be used for ultrasonic frequencies below 50 kHz without the aliasing effects that result in copies of the main lobe of the directivity pattern. For MEMS microphones with dimensions in the neighborhood of 3 mm, the minimum inter-microphone spacing possible is also in the neighborhood of 3 mm resulting in an $f_{max}$ value around 50 kHz.

d) The atmospheric attenuation of ultrasound is a function of frequency and increases from about 1 dB/m at 40 kHz to about 10 dB/m at 170 kHz. Therefore, in practice, ultrasonic gas leak detector designs are restricted to frequencies below about 75 kHz; the same frequency limit would apply to beamforming due to atmospheric attenuation, further restricted to 50 kHz due to the aforementioned practical limits on inter-microphone spacing. Ultrasonic gas leak detectors have a range of a few tens of meters for gas leaks for industry standard leak rates of order of 0.1 kg/sec.

FIG. 2 is an illustration of a linear array 20 of five MEMS microphones (1, 2, 3, 4, and 5) with inter-microphone spacing d and with sound incident at an angle θ to the microphone array axis. The MEMS microphone 1 rightmost in the figure receives the sound earlier than the MEMS microphone 2 to its left; the difference is known as time difference of arrival (TDOA). In the far field approximation, the sound source is far away compared to the microphone spacing and wavelength of the sound. Such approximation is valid in the case of a gas leak several meters away. The sound wave front received over the extent of the array in the far field may be considered planar rather than spherical; for a planar wavefront the difference in the time δt for receipt of sound between successive microphones is $$\delta t = (d * \cos \theta)/v \quad (1)$$

where v is the speed of sound in air, typically 340 m/sec. In the frequency domain, the delay results in a phase shift between the signals received by the microphones. The delays are directly related to the incident angle and the geometry of the microphone array. Given the geometry of the microphone array, the delays or phase differences can be used to estimate the incident angle of arrival of the incident energy.

A technique known as Delay-and-Sum Beamforming may be used to estimate the incident angle θ. If a time delay is added to the recorded signal from each microphone that is equal and opposite of the delay caused by the extra travel time, it will result in signals that are perfectly in-phase with each other. Summing these in-phase signals will result in constructive interference that will amplify the result by the number of microphones in the array and result in a main lobe in the directivity pattern. This is known as Time-Delay-and-Sum beamforming. For DOA (direction of arrival) estimation, also known as AOA (angle of arrival), one can iteratively test time delays for all possible directions. If the guess is wrong, the signal will destructively interfere, resulting in a diminished output signal, while the correct guess will result in the signal amplification described above. In practice, the time delay is continuously swept resulting in beamsteering from an initial angle (0 degrees typically) to a final angle (180 degrees typically). The angle of steering is obtained by inverting Equation 1 to get $$\theta = \cos^{-1}(\delta t * v/d) \quad (2)$$

In an exemplary embodiment, the steering angle is increased in steps of 2.5 degrees in 72 steps providing for 180 degrees of beamsteering. This beamsteering is performed independently for each of the two perpendicular ULAs of FIG. 1. The azimuthal and elevation (φ, θ) angular coordinates generated by the two perpendicular ULAs referenced to the axis perpendicular to the planar array result in a cone of sound sweep. In an exemplary embodiment, at each step angle, the signals from each MEMS microphone in the array of FIG. 1 are sampled at 150 kHz for n data samples where n may be 256.

Figure 3:
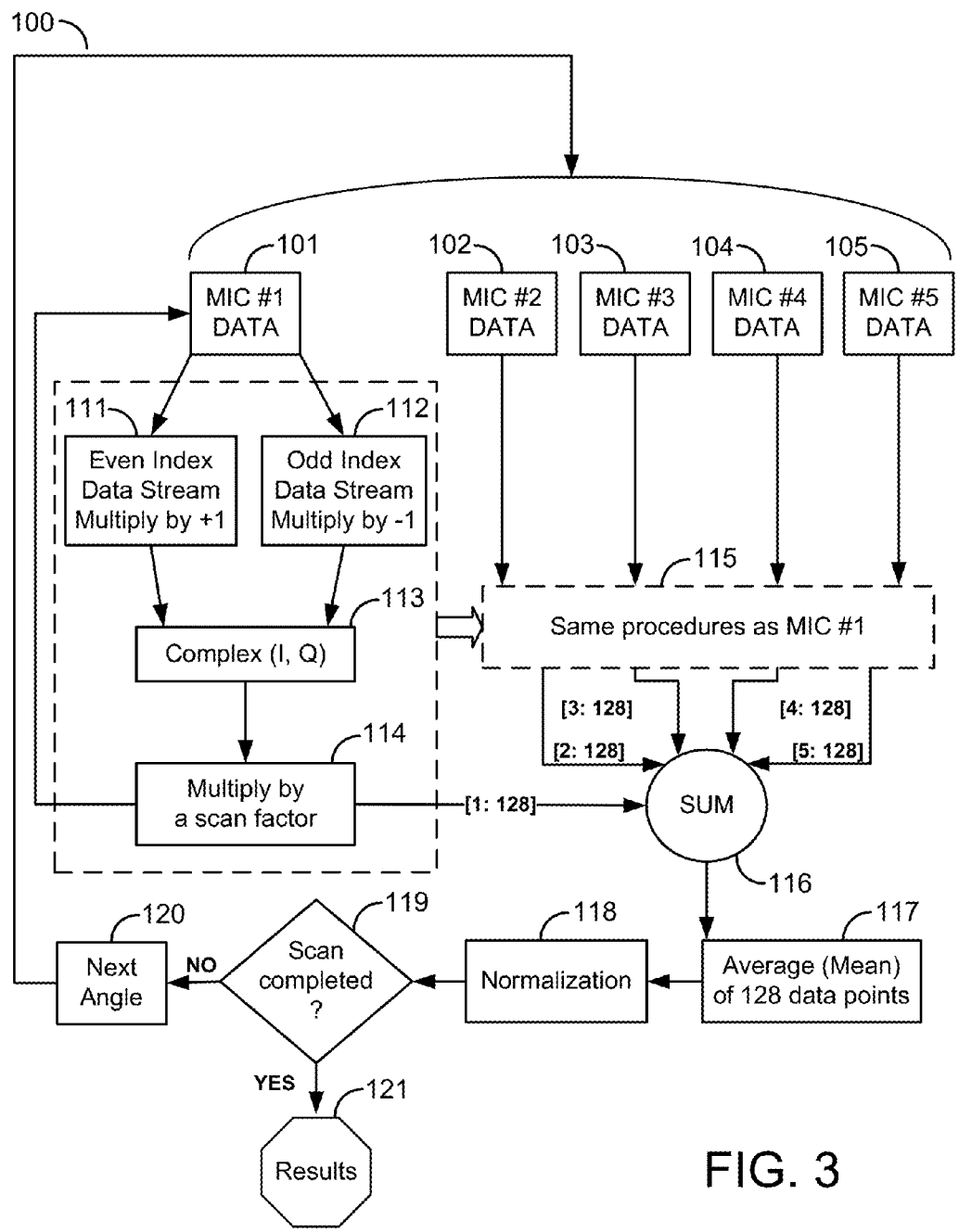
FIG. 3 is an exemplary embodiment of a software algorithm used in time-delay-and-sum beamforming for an ultrasonic microphone array.

FIG. 3 shows an exemplary embodiment of a functional software implementation of Time-Delay- and Sum beamforming. Signals (101-105) from the MEMS microphones are sampled for n data samples where n may be 256 at the sampling rate of 150 kHz; five microphones are shown here as in the FIG. 1 and FIG. 2 ULAs, but for beamforming the ULA could have any number of microphones greater than a minimum of two. The sampled data stream is split into even and odd values by multiplying by even 111 or odd numbers 112. The even (I in-phase) and odd (Q out of phase or quadrature) data are combined in 113, to create a complex number that is easier for subsequent software processing to generate the peak amplitude corresponding to constructive interference along the direction of arrival (DOA). This in-phase and quadrature technique is well known in digital signal processing. The complex number generated at 113 is multiplied by the scan factor 114, which is a complex number comprised of the cosine and sine of the steering angle θ (Eq. 2).

$$\text{scan factor}(n) = \text{complex}(\cos(\theta_n),(\sin(\theta_n)) \quad (3)$$

where n is the steering angle direction between 0 and 180 degrees, for example, in 72 steps.

The data from each of the other MEMS microphones is processed similarly 115 and the processed signals from all MEMS microphones summed 116. The summed data 116 is averaged 117 and normalized 118 to the maximum value computed over all scan angles. The process is continued 119 for each scan angle 120 from 0 to 180 degrees. The maximum normalized value direction obtained over all steering angles is the DOA of the ultrasound.

The computation described in FIG. 3 is performed continuously, and for the parameters described above (150 kHz sampling rate, 256 data samples per step, 72 steps), the time for a complete 0 to 180 degree scan is about 0.1 second in one exemplary embodiment. Using the exemplary beamforming parameters described above, the Time-Delay-and-Sum beamformer is thus able to generate a DOA plot 121 once every tenth of a second. The beamforming plot may be averaged over ten scans giving a response time of about a second. It should be noted that if there is more than one source of ultrasound the beamforming plot may indicate more than one DOA vector; the user is provided the relative strength of the local maxima peaks in the entire beamforming scan enabling action to be taken accordingly. The magnitude of the main lobe peak in a beamforming scan is indicative of the strength of the ultrasonic source. A single planar microphone array computes the direction of arrival but not the distance to the ultrasound source; consequently, a strong ultrasound source far away may generate the same SPL and main lobe peak size as a weaker ultrasound source nearer to the microphone array.

In an exemplary embodiment, the DOA is considered to be meaningful only if the ultrasound SPL is above a specified threshold, for example, 65 dB may be used as a threshold below which a warning may be generated but not an alarm.

For the exemplary 2-dimensional array such as shown in FIG. 1, the DOA computation is performed independently for each ULA, providing two independent angles (φ, θ) that provide for the azimuth and elevation direction of the pressurized gas leak relative to the axis perpendicular to the planar microphone array. In the far field approximation where the gas leak source to be detected is several meters away, the fact that the MEMS microphone array of FIG. 1 is in the shape of a "T" does not cause any significant error over a more natural and centered MEMS microphone array in the form of an "+" where the intersection of the two linear arrays is the origin of the coordinate system.

FIG. 3 is a flow diagram illustrating an exemplary embodiment of Time-Delay-and-Sum beamforming for a directional gas leak detector. Other beamforming techniques are available and known to those skilled in the art. These beamforming techniques include several types of frequency or spectrum based beamforming that are detailed in the references and may be considered to be within the scope and spirit of the invention. Whereas the planar array embodied in FIG. 1 is made up of two perpendicular linear arrays, beamforming can also be performed with square, rectangular, or circular arrays on planar or contoured surfaces, with larger number of analog or digital MEMS microphones at the expense of additional electronic circuitry, mathematically complex beamforming algorithms, and increased on-board computational power and memory. Various modifications and changes thereto can be made by persons skilled in the art without departing from the scope and spirit of the invention.

In order to use MEMS microphones in industrial applications, the microphone is preferably packaged to meet the requirements for operation in a hazardous location as defined by governing agency bodies. One globally accepted method of protection for gas detectors is the explosion proof method (Ex d), which ensures that any explosive condition is contained within the enclosure, does not ignite the surrounding environment, and may utilize a flame arrestor as a protective element in front of the sensing element. Another method of protection is intrinsic safety (Ex ia), which is covered by IEC 60079-11 from the International Electrotechnical Commission. In the intrinsically safe method of protection an intrinsically safe electrical circuit is used with the sensing element; this barrier circuit limits the power to the sensing element such that no sparks can be generated leading to ignition of an explosive gas mixture. U.S. patent application Ser. No. 14/495,739, the entire contents of which are incorporated herein by this reference, details the packaging and methods of protection of microphone arrays for hazardous locations.

Figure 4B:
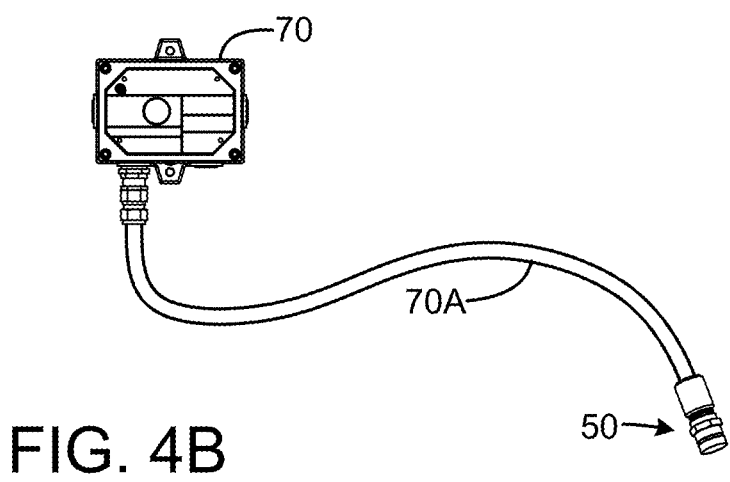
FIG. 4B illustrates another embodiment of a microphone array gas leak detector, with the sensing head housing the microphone array remote from the main system housing.

In an exemplary embodiment, FIG. 4A depicts the microphone array 10 of FIG. 1 mounted in a housing 50 connected to a housing 70 that contains the electronics to condition and process the sensor microphone array signals. The housing 70 may include a display 76. Further, in other embodiments, the microphone array system 50 can be mounted remotely from the enclosure 70, and the connection between the remote housing and the enclosure may meet the requirements for operation in an explosive, hazardous environment. An exemplary embodiment of a remotely-mounted microphone array is illustrated in FIG. 4B. A communication link such as an electrical cable 70A in a conduit provides a signal connection between the microphone array 50 and the housing 70.

Figure 5:
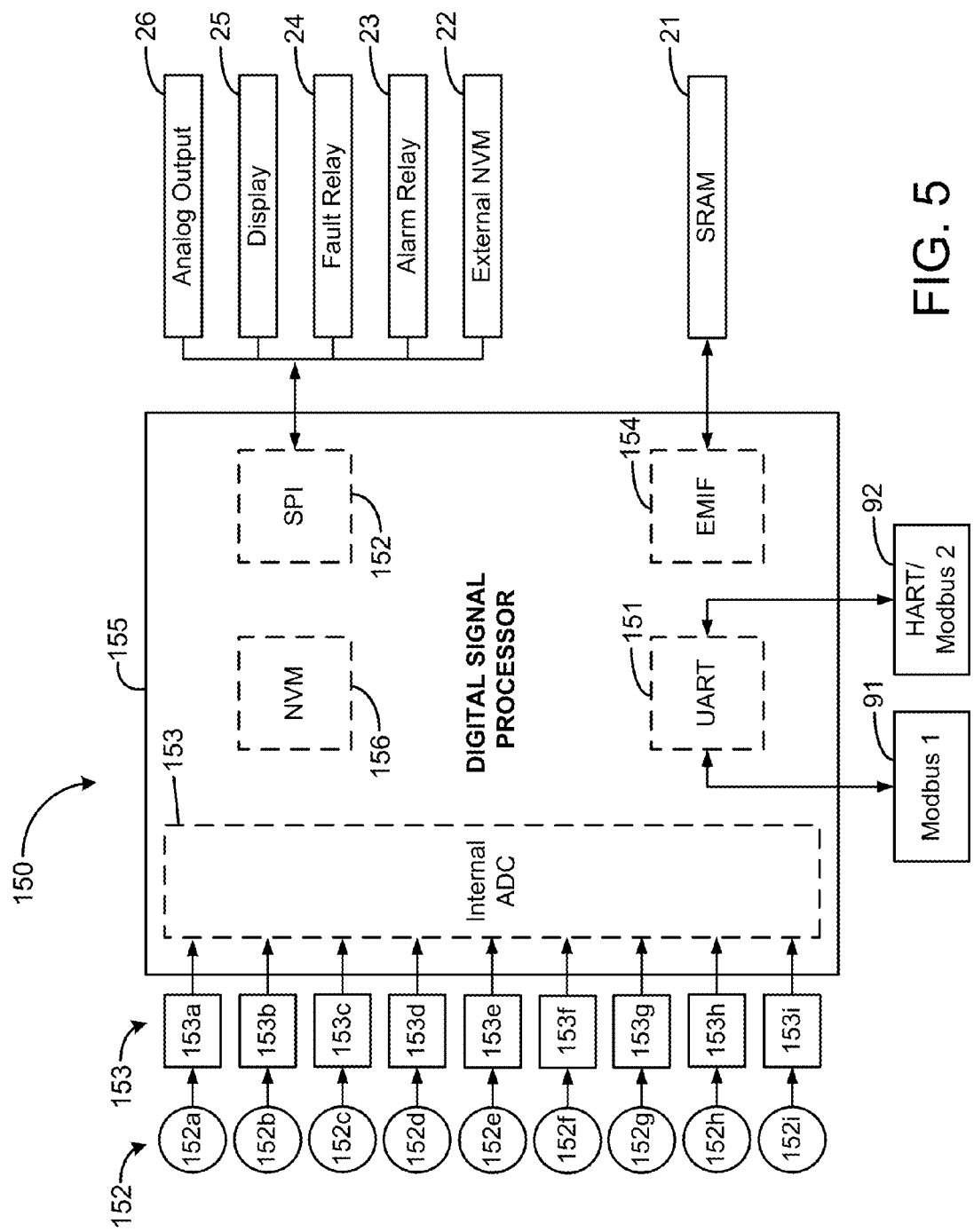
FIG. 5 is a schematic block diagram of features of the directional ultrasonic gas leak detector of FIGS. 1-3.

In an exemplary embodiment of a gas leak detector system 150 employing an array of MEMS microphones, shown in FIG. 5, outputs of nine MEMS microphones (52a through 152i) are signal conditioned (153a through 153i), then digitized 153 if the microphone outputs are analog, and further processed in the ultrasonic gas leak detector 150, which includes an electronic controller 155, e.g., a digital signal processor (DSP), an ASIC or a microcomputer or microprocessor based system. For the case where the microphones provide digitized outputs, the signal conditioning 153a through 153i includes analog-to-digital conversions, and the internal ADC 153 is not necessary. In an exemplary embodiment, the signal processor 155 may comprise a DSP, although other devices or logic circuits may alternatively be employed for other applications and embodiments. In an exemplary embodiment, the signal processor 155 also comprises a dual universal asynchronous receiver transmitter (UART) 151 as a serial communication interface (SCI), a serial peripheral interface (SPI) 152, an internal ADC 153 (if necessary), an external memory interface (EMIF) 154 for an external memory (SRAM) 21, and a non-volatile memory (NVM) 156 for on-chip data storage. Modbus 91 or HART 92 protocols may serve as interfaces for serial communication over UART 151. Both protocols are well-known in process industries, along with others such as PROFIbus, Fieldbus and CANbus, for interfacing field instrumentation to the user's computer or programmable logic controller (PLC). In an exemplary embodiment, the signal processor 155 is connected to a plurality of other interfaces through the SPI 152. These interfaces may include an external NVM 22, an alarm relay 23, a fault relay 24, a display 25, and an analog output 26.

In an exemplary embodiment, the analog output 26 may produce an indicative current level between 0 and 20 milliamps (mA), which can be used to trigger a remedial action, such as, by way of example only, shutting down process equipment pursuant to an established facility protocol. A first current level at the analog output 26, for example between 4 mA and 20 mA, may be indicative of a gas leak, a second current level at the analog output 26, for example 4 mA, may be indicative of normal operation, e.g., when no gas leak is present, and a third current level at the analog output 26, for example, 0 mA, may be indicative of a system fault, which could be caused by conditions such as electrical malfunction. In other embodiments, other current levels may be selected to represent various conditions.

In an exemplary embodiment, the signal processor 155 is programmed to perform signal pre-processing and artificial neural network (ANN) processing, as discussed more fully below. The signal processor 155 performs a beamforming function, as described more fully below. On detection of ultrasound from a gas leak the computed azimuthal and elevation angles of arrival ($\varphi$, $\theta$) of the ultrasound along with the sound pressure level (SPL) measured may be transmitted to the user via display 25, Modbus or HART (91 or 92). (In FIG. 6 and FIG. 7, angles of arrival ($\varphi$, $\theta$) are shown in a separate block 27 for convenience.) In a further exemplary embodiment, to be described more fully, this information may be used to superimpose the gas leak SPL and directional coordinates onto an image of the surveilled scene.

U.S. Pat. No. 8,955,383, the entire contents of which are incorporated herein by reference, details how an artificial neural network (ANN) may be used in an ultrasonic gas leak detector to discriminate ultrasound generated by pressurized gas leaks from nuisance ultrasound created by, for example, machinery or biological sources. The ANN may be used in conjunction with a sound pressure level (SPL) threshold (see FIG. 2 of U.S. Pat. No. 8,955,383), or bypass the use of a SPL threshold (see FIG. 5 of U.S. Pat. No. 8,955,383). In the present exemplary embodiment, where beamforming is used to determine the DOA of the received ultrasound, an ultrasonic gas leak detector with an ANN as described in U.S. Pat. No. 8,955,383 may be used to determine if the received ultrasound energy is emanating from a pressurized gas leak (a threat) or emanating from a nuisance source (a false alarm). The SPL measurement and ANN computation may be performed using signals from any of the MEMS microphones belonging to the two ULAs. In the instance where the DOA plots show a single source of ultrasound, the direction of the pressurized gas leak or nuisance ultrasound may be identified. Non-ANN based signal processing could also be used to discriminate the presence of gas leaks from nuisance ultrasound. Alternately, the ultrasonic gas leak detector may be a simple threshold device with no means to distinguish gas leak ultrasound from nuisance ultrasound. Beamforming using ULAs and DOA computation is thus independent of the gas leak discrimination capability of the ultrasonic gas leak detector. As mentioned earlier, an SPL threshold, for example 65 dB, may be used along with DOA information to decide on the need for user action: such thresholds eliminate the triggering of alarms for low levels of detected gas leak or nuisance ultrasound.

Figure 6:
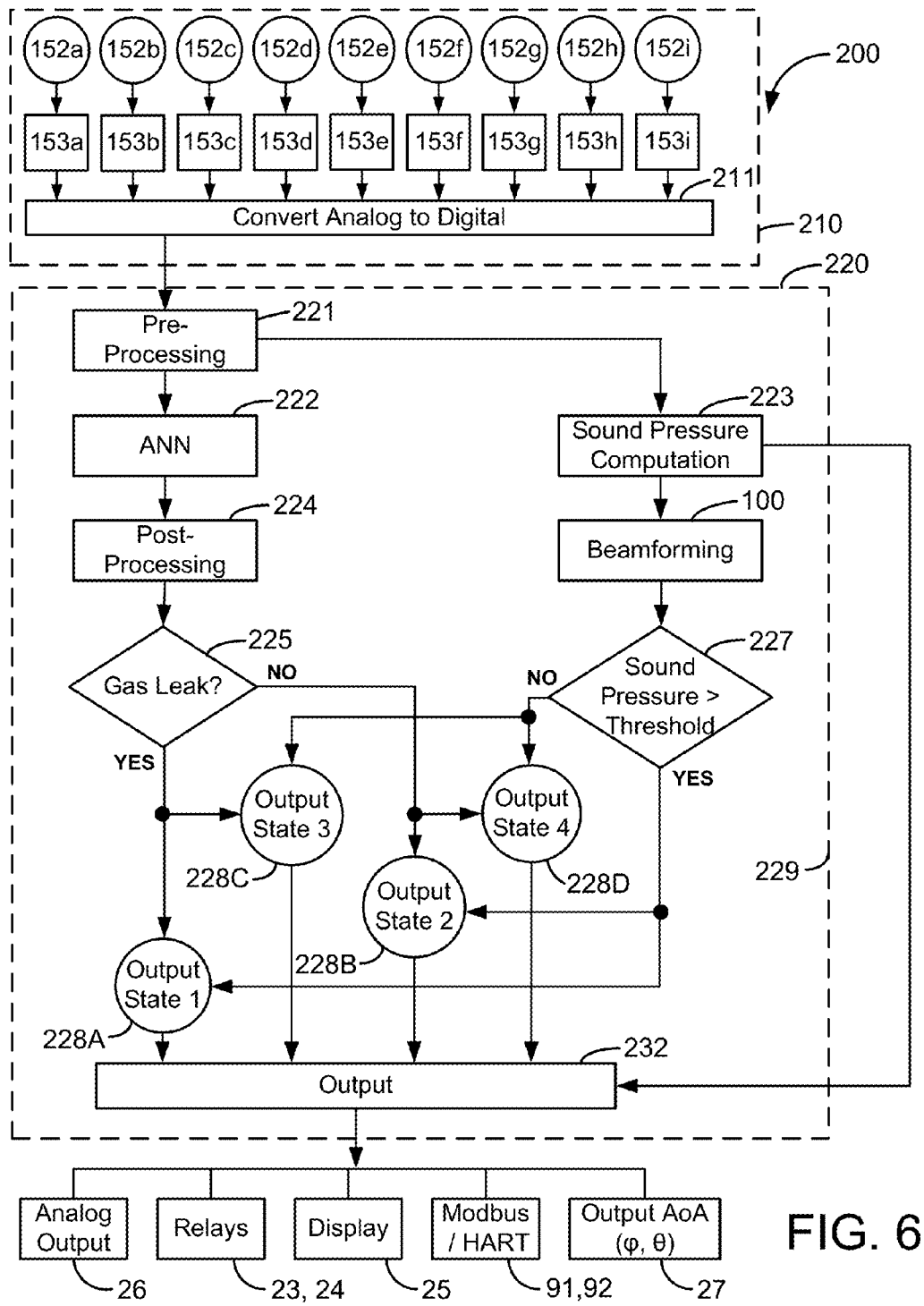
FIG. 6 is a functional block diagram of features of an embodiment of a directional ultrasonic gas leak detector employing an array of microphones.

FIG. 6 is a functional block diagram 200 of an exemplary directional ultrasonic gas detector which may be implemented by suitable programming of the digital signal processor 155 (FIG. 5). The outputs of nine analog (in this exemplary embodiment) MEMS microphones (152a through 152i) comprising, for example, the two perpendicular ULAs of FIG. 1 are signal conditioned (153a through 153i), then digitized 211, generally indicated as 210. Processing algorithms 220 are then applied to the sensor data, including signal pre-processing 221, ANN validation function 222, and post-processing 224, and sound pressure computation 223 as detailed in U.S. Pat. No. 8,955,383. Beamforming 100 as described, for example, in the flow-chart of FIG. 3 provides the angle of arrival and peak values of incident ultrasound. In an exemplary embodiment, the computed sound pressure level (SPL) 223 is compared against a preset threshold 227, while the post processed ANN provides a determination as to whether the microphone signal is generated by a real gas leak 225. In an exemplary embodiment, the combination of the decision blocks 225 and 227 result in four combinations:

Output state 228A for combination (1) Yes to Gas Leak & (2) Yes to SPL>threshold Output state 228B for combination (1) No to Gas Leak & (2) Yes to SPL>threshold Output state 228C for combination (1) Yes to Gas Leak & (2) No to SPL>threshold Output state 228D for combination (1) No to Gas Leak & (2) No to SPL>threshold Output state 228A corresponds to the case of a real gas leak, one with ultrasound that exceeds the SPL threshold 227 and emanates from computed ($\varphi$, $\theta$) azimuth and elevation angles. The threshold value 227 may be considered a gas detection threshold; the user may choose to set a higher alarm threshold for alarm relay 23 in the output block 230. Output state 228B corresponds to the situation where the large measured SPL has been diagnosed as being caused not by a gas leak, but rather by a false alarm source located at the computed ($\varphi$, $\theta$) azimuth and elevation angles. Output state 228C corresponds to the detection of a real gas leak, but small enough in magnitude to produce an SPL less than the threshold 127. Output state 228C may be considered to be a minor leak, or to provide a warning to the user of an imminent larger leak. The user would typically not take corrective action but is advised to monitor the facility more closely. Output state 228D corresponds to the situation where nothing much is happening; there is no evidence of a gas leak, no peak in the beamforming plot, with the background SPL at a value considered insignificant. Output state 228D would be typical of a quiet industrial environment such as a remote onshore wellhead.

Figure 7:
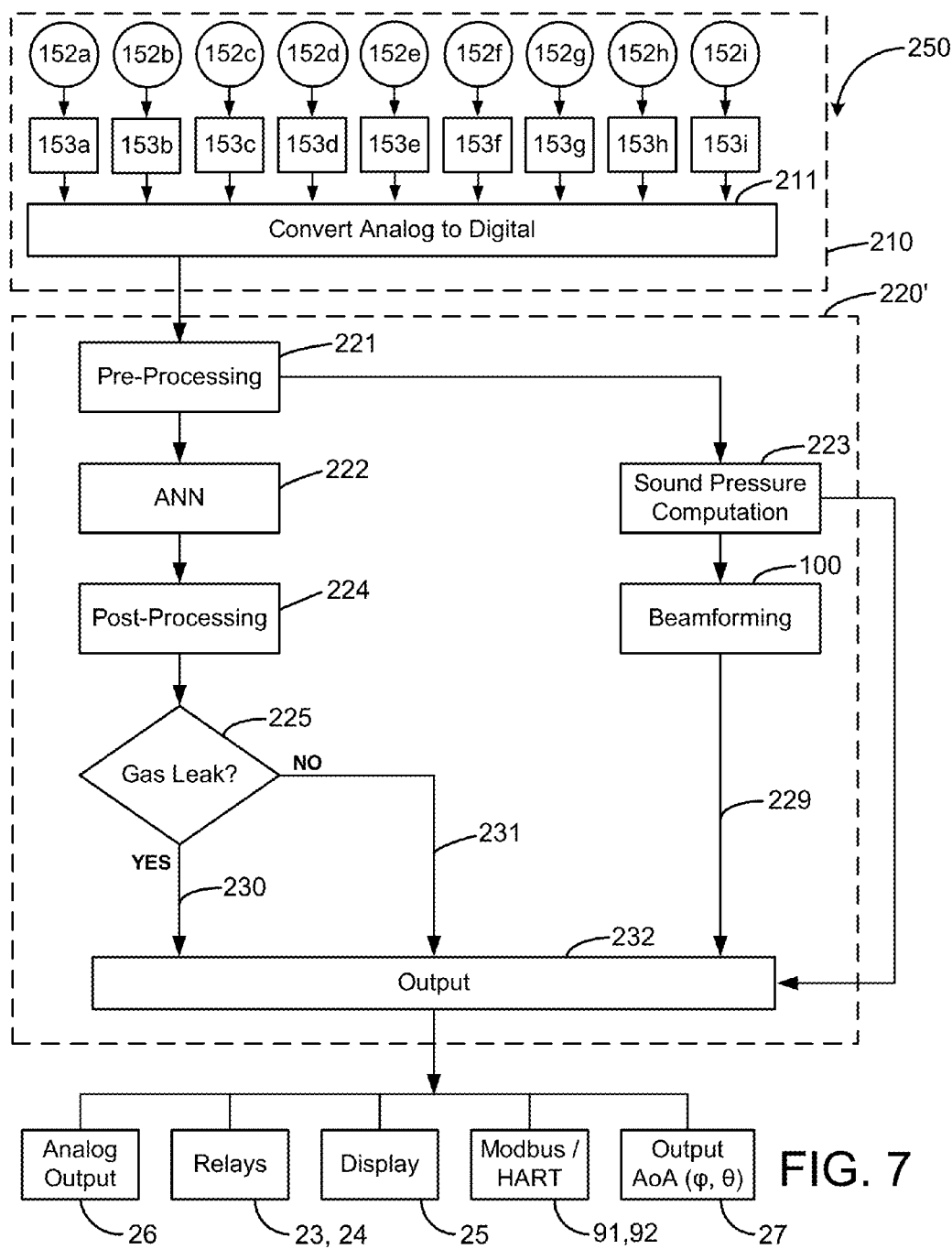
FIG. 7 is a functional block diagram of features of another embodiment of a directional ultrasonic gas leak detector.

Referring now to FIG. 7, features of another exemplary embodiment of an ultrasonic gas leak detector 250 are depicted, depicting a functional block diagram of the gas leak detector. This embodiment is similar to that described in FIG. 6. However, in this exemplary embodiment, the signal processor 155 is programmed to implement processing algorithms 220', in which the computed SPL from sound pressure computation 223 is not compared against a preset threshold as shown in block 227 of FIG. 7. Rather, the computed SPL 229 is sent directly to the output block 230. At the same time, the post processed ANN provides a determination via decision block 225 as to whether the ultrasound is generated by a real gas leak indicated by output state 230 or by a false alarm as shown by output state 231. The output block 230 then informs the user of the presence (from output state 232), AOA direction 27 ($\varphi$, $\theta$) and severity (SPL in dB) (from signal 229) of a real gas leak via the output functions of the alarm relay 23, display 25, analog output 26, and external communication interfaces such as Modbus 91 and HART 92. If the computed SPL is shown to be created by a false alarm via output state 231 from decision block 225, the output block 230 can similarly inform the user of the false alarm event and its severity (in dB) via display 25, analog output 26, and external communication interfaces such as Modbus 91 and HART 92; in the case of a false alarm event indicated by output state 231 the alarm relay 23 would, however, not be activated.

Figure 8A:
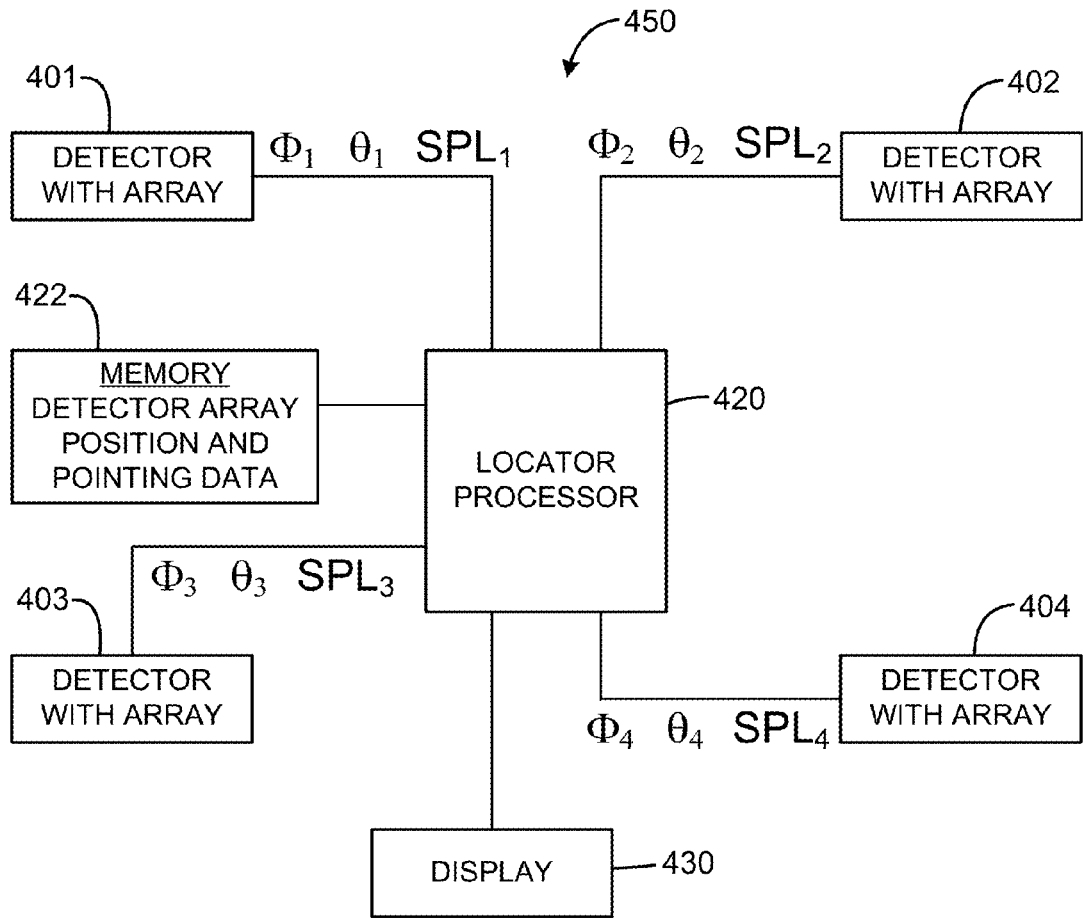
FIGS. 8A-8C are schematic diagrams of three exemplary embodiments of an ultrasonic gas leak location system.

FIG. 8A schematically illustrates an exemplary embodiment of an ultrasonic gas leak detector system 450, employing a plurality of ultrasonic gas leak detectors with microphone arrays 401, 402, and a locator processor 420 connected to the detectors for receiving electrical signals generated by the detectors. The detectors are spatially separated. The location of the detectors will depend on the particular installation; an exemplary separation distance may be on the order of tens of meters, similar to the range of the detectors. The electrical signals may be indicative of the detected angle of arrival and the strength of received ultrasonic energy at the respective detector arrays, defined by azimuthal and elevation ($\varphi$, $\theta$) angular coordinates and the sound pressure level (SPL in dB). The system includes at least two detectors 401, 402, but may include additional detectors; FIG. 8A depicts exemplary optional detectors 403, 404 although these additional detectors may be omitted, depending on the requirements of a particular application. The locator processor 420 is configured to process the signals from the respective detectors to determine coordinate location of the sources(s) of the ultrasonic energy received at the detectors. The system includes a digital memory 422 for storing data, including position data representing the positions of each of the arrays of the respective detectors 401, 402, 403, 404, and a display 430 for displaying the computed ultrasonic sound source position.

Triangulation is the process of determining the location of a point by measuring angles to it from known points at either end of a fixed baseline. If two microphone array ultrasonic gas leak detectors, e.g. detectors 401, 402, detect a pressurized gas leak, the beams of both will point in the direction of the source of the ultrasonic energy. In an exemplary embodiment, if the two microphone array gas leak detectors communicate their azimuthal and elevation ($\varphi$, $\theta$) angular coordinates to locator processor 420, the locator processor may calculate the position in three dimensions of the sound source. In another exemplary embodiment 480, illustrated in FIG. 8B such processing occurs in one of the two microphone array gas leak detectors if the other microphone array gas leak detector communicated the azimuthal and elevation coordinates for the angle of arrival of the ultrasonic energy. In system 480, the microphone array gas leak detector 481 also includes the locator processor, as well as a beamformer, and receives the coordinates of the received ultrasonic energy from respective detectors 482, 483 and 484. The system 480 further includes a memory 486 for storing detector array position and array pointing direction data for the respective detectors, and a display 490. The locator processor is configured to calculate the position in three dimensions of incident ultrasonic energy from the data from any two of the plurality of detectors. In either embodiment the communication of angular coordinates could be through wired (such as Modbus) or wireless connections.

Figure 8B:
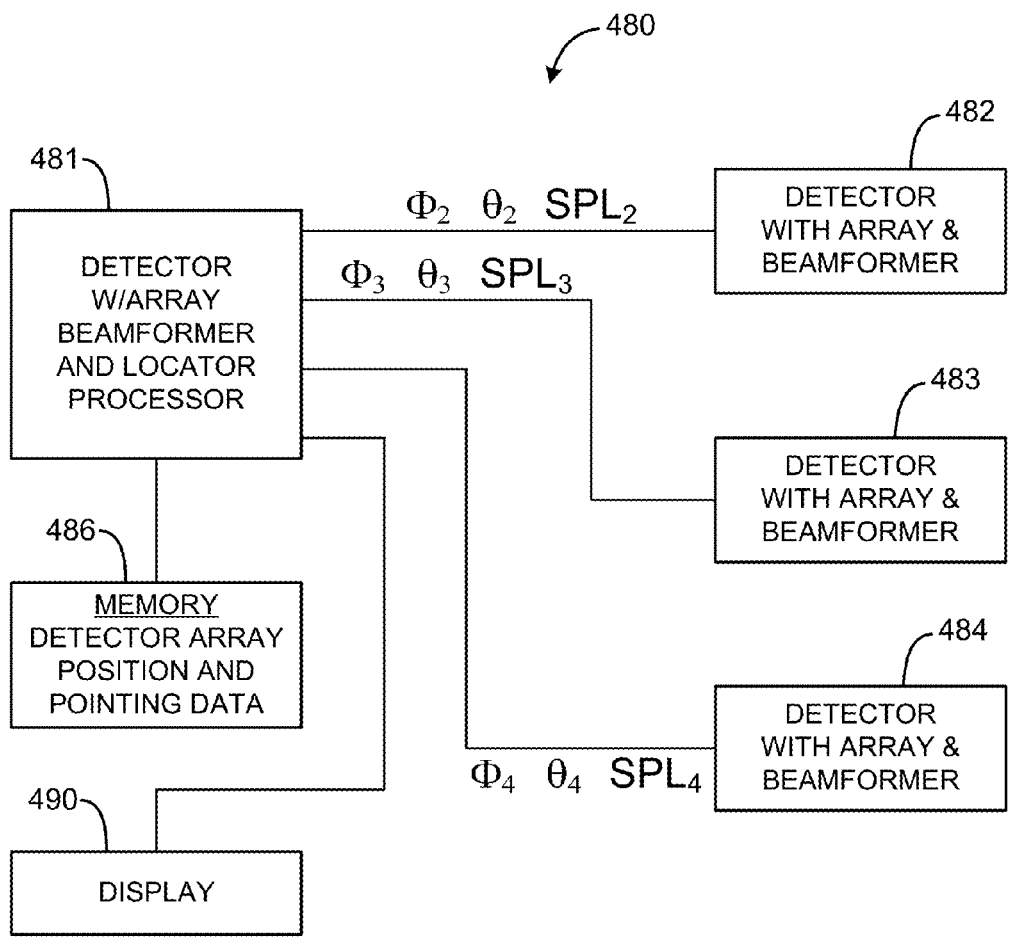
Figure 8C:
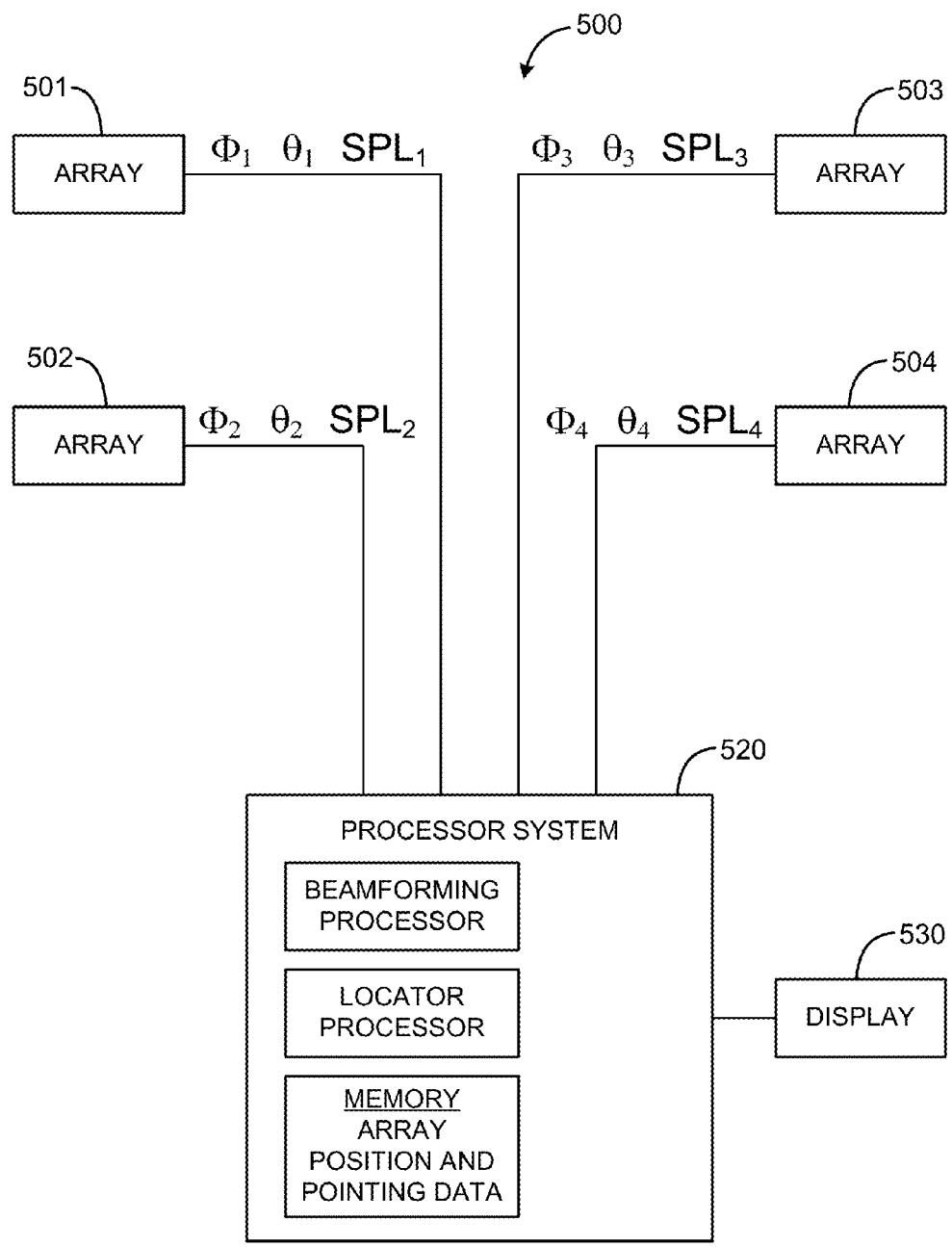

FIG. 8C illustrates a further exemplary system 500, in which the microphone arrays 501, 502, 503, 504 are arranged in spatially separated locations, and the microphone signals transmitted by wired or wireless communication links to a remotely located, processor system 520, which includes a beamforming processor to handle the beam forming computations carried out by the individual detector beamformers in the embodiments of FIGS. 8A and 8B. The beamforming computations for the respective arrays may be performed serially, or in parallel if a processor of sufficiently robust capacity is available. The processor system 520 further includes a locator processor, is configured to perform the processing functions of locator processor 420 (FIG. 8A) and the locator processor comprising detector 481 (FIG. 8B). As with the embodiments of FIGS. 8A and 8B, the system 500 includes a display for displaying the computed ultrasonic sound source position.

Figure 9A:
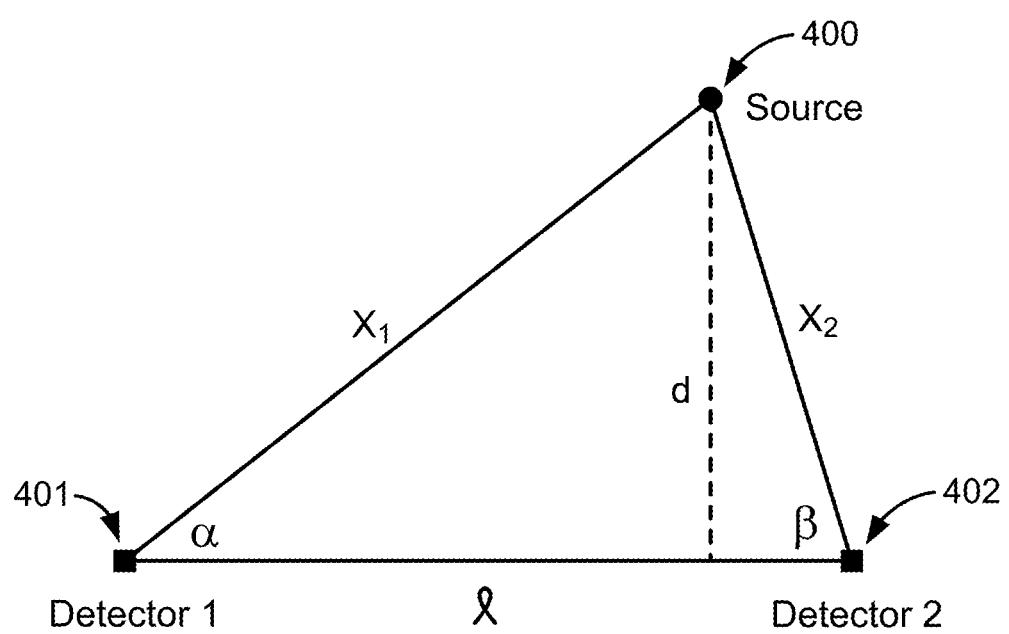
FIG. 9A is an illustration of the distances and angles used in triangulation to calculate the position of a pressurized gas leak.

To illustrate an exemplary triangulation calculation, consider the simple case (FIG. 9A) in which two microphone array ultrasonic gas leak detectors 401 and 402 respectively measure the ultrasonic source 400 at the same elevation, which is zero degrees in a plane. Then if e is the distance between the two microphone array ultrasonic gas leak detectors 401 and 402 and d is the perpendicular distance to the ultrasonic source 400 as shown in FIG. 8A, then $$\ell = \frac{d}{\tan\alpha} + \frac{d}{\tan\beta} \tag{5}$$

where $\alpha$ and $\beta$ are the azimuth angles shown in FIG. 9A. This leads to $$\ell = d\left(\frac{\cos\alpha}{\sin\alpha} + \frac{\cos\beta}{\sin\beta}\right) \tag{6}$$

which leads to $$\ell = d\frac{\sin(\alpha+\beta)}{\sin\alpha\sin\beta} \tag{7}$$

which leads to $$d = \ell \frac{\sin\alpha \sin\beta}{\sin(\alpha + \beta)} \quad (8)$$

The distance of the gas leak source 400 from the ultrasonic gas leak detectors 401 and 402 is given by $$X_1 = d/\sin(\alpha) \quad (9)$$

$$X_2 = d/\sin(\beta) \quad (10)$$

Knowing $X_1$ and the angle $\alpha$ from ultrasonic gas leak detector 401, or $X_2$ and the angle $\beta$ from ultrasonic gas leak detector 402, provides for the exact position of the gas leak source 400. Similar calculations can be done for elevation angles, the calculations for azimuth and elevation being independent. As the two microphone arrays for detectors 401, 402 may themselves in general have different pointing azimuth and elevation broadside angles ($\varphi_{1b}$, $\theta_{1b}$, and $\varphi_{2b}$, $\theta_{2b}$, respectively), and positions (vectors $R_1$ and $R_2$ respectively), the processor incorporates the microphone array pointing angles and position in the computation as offsets.

Figure 9B:
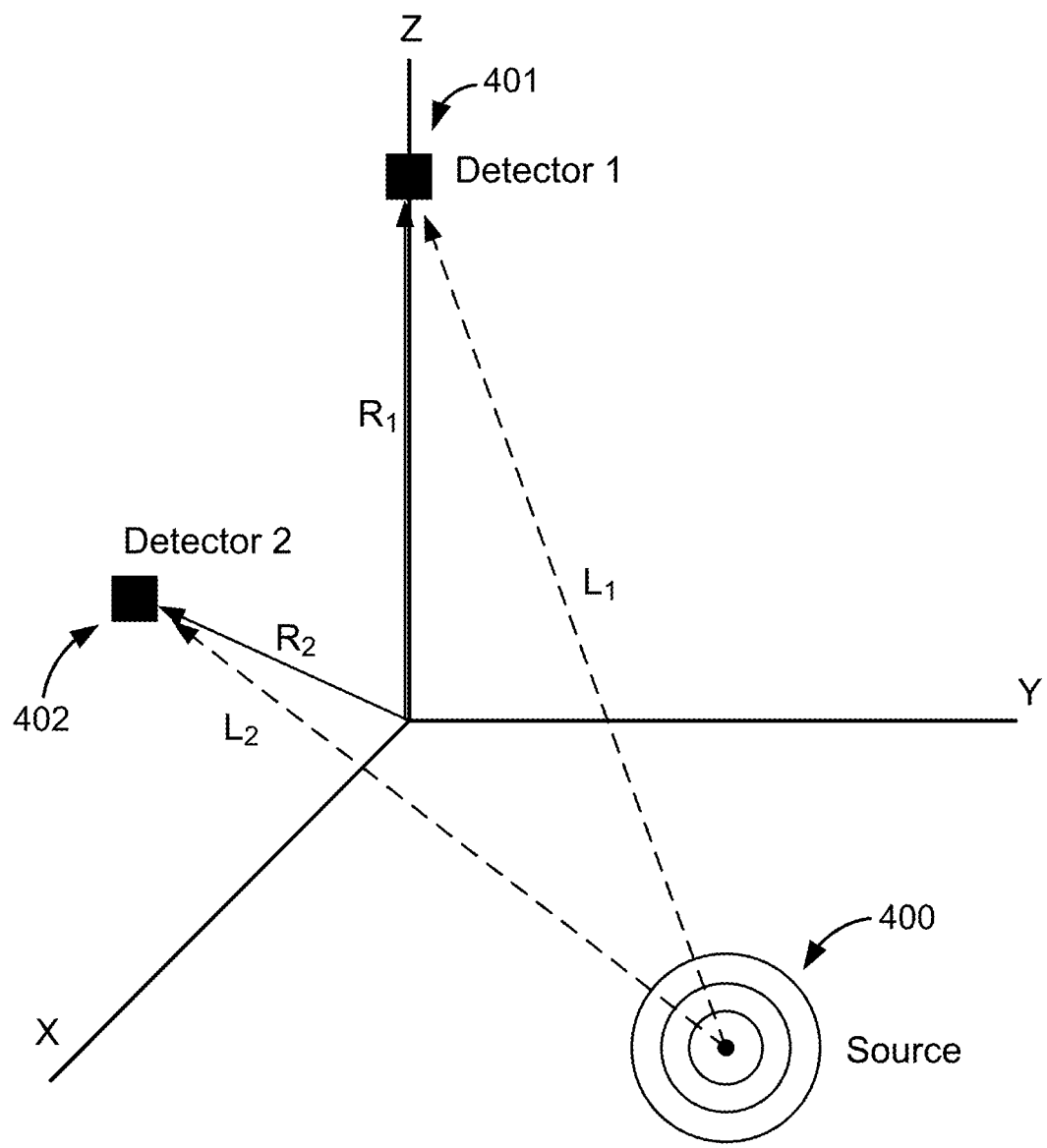
FIG. 9B is a pictorial of two microphone arrays both pointing towards a source of pressurized gas leak.
Figure 9C:
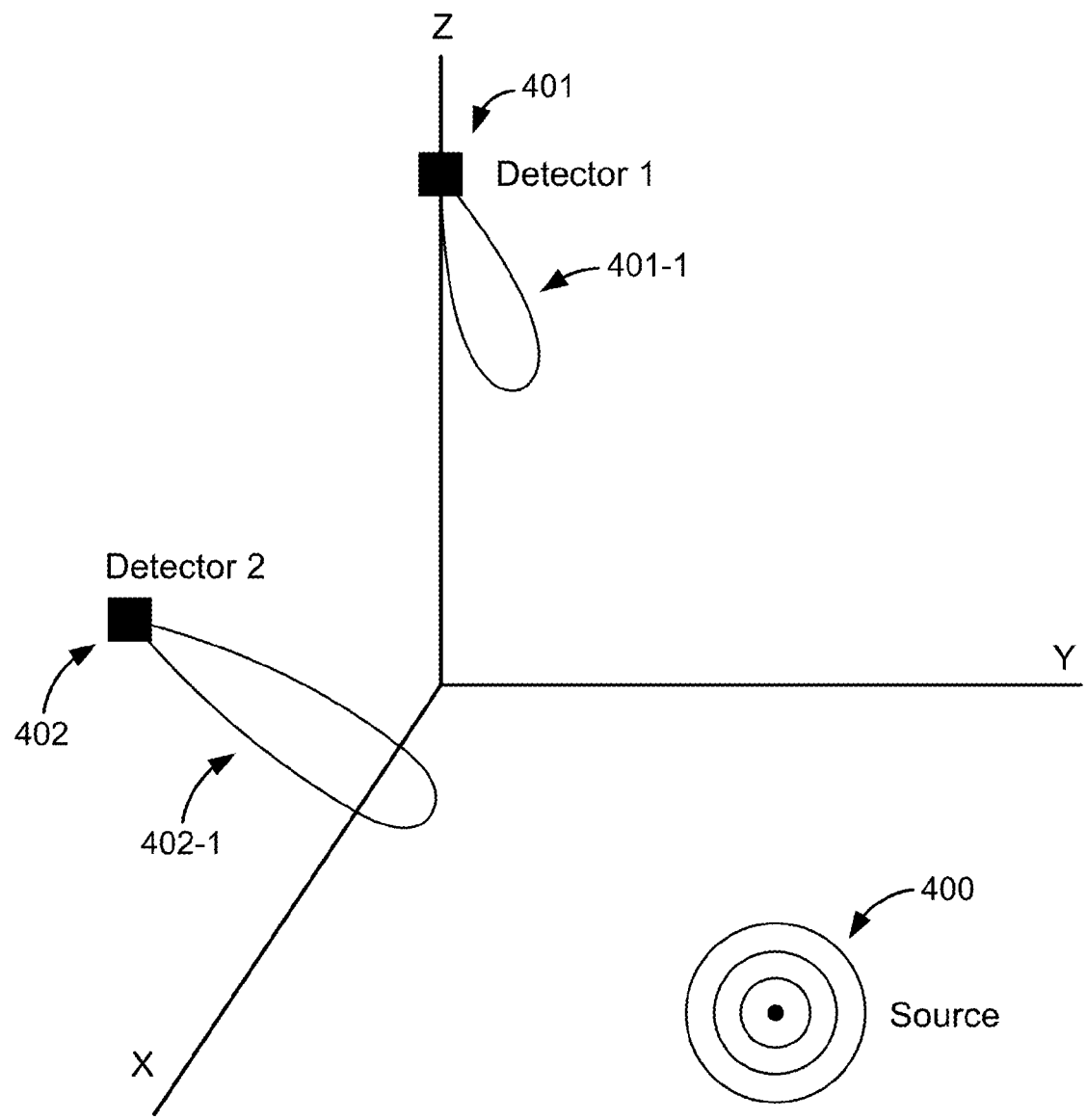
FIG. 9C is a diagrammatic pictorial of the beamforming lobes of two microphone arrays both pointing towards a source of pressurized gas leak.

A minimum of two microphone arrays is required to triangulate an ultrasonic source but more than two microphone arrays can be used in any combination of two of them. FIG. 9B is a pictorial of an exemplary embodiment of two microphone arrays with different azimuthal and elevation (I), e) angular coordinates and positions (vectors $R_1$ and $R_2$ respectively) both pointing towards a source of pressurized gas leak (which is an omnidirectional sound source in general), at distances $L_1$ and $L_2$ respectively. In FIG. 9C the length of the lobes 403 and 404 represent the SPL in dB measured by each microphone array. The further away the microphone array from the gas leak the smaller the measured SPL and the shorter the lobe; in this example, $L_1$ is greater than $L_2$. More microphone array combinations surveilling a scene provide for redundancy, and can help locate a gas leak source if sound obstructing objects are in the path between a particular microphone array gas leak detector and the gas leak source. More microphone array combinations also help if there are multipath echoes that may confuse a particular combination of two microphone arrays.

Figure 10:
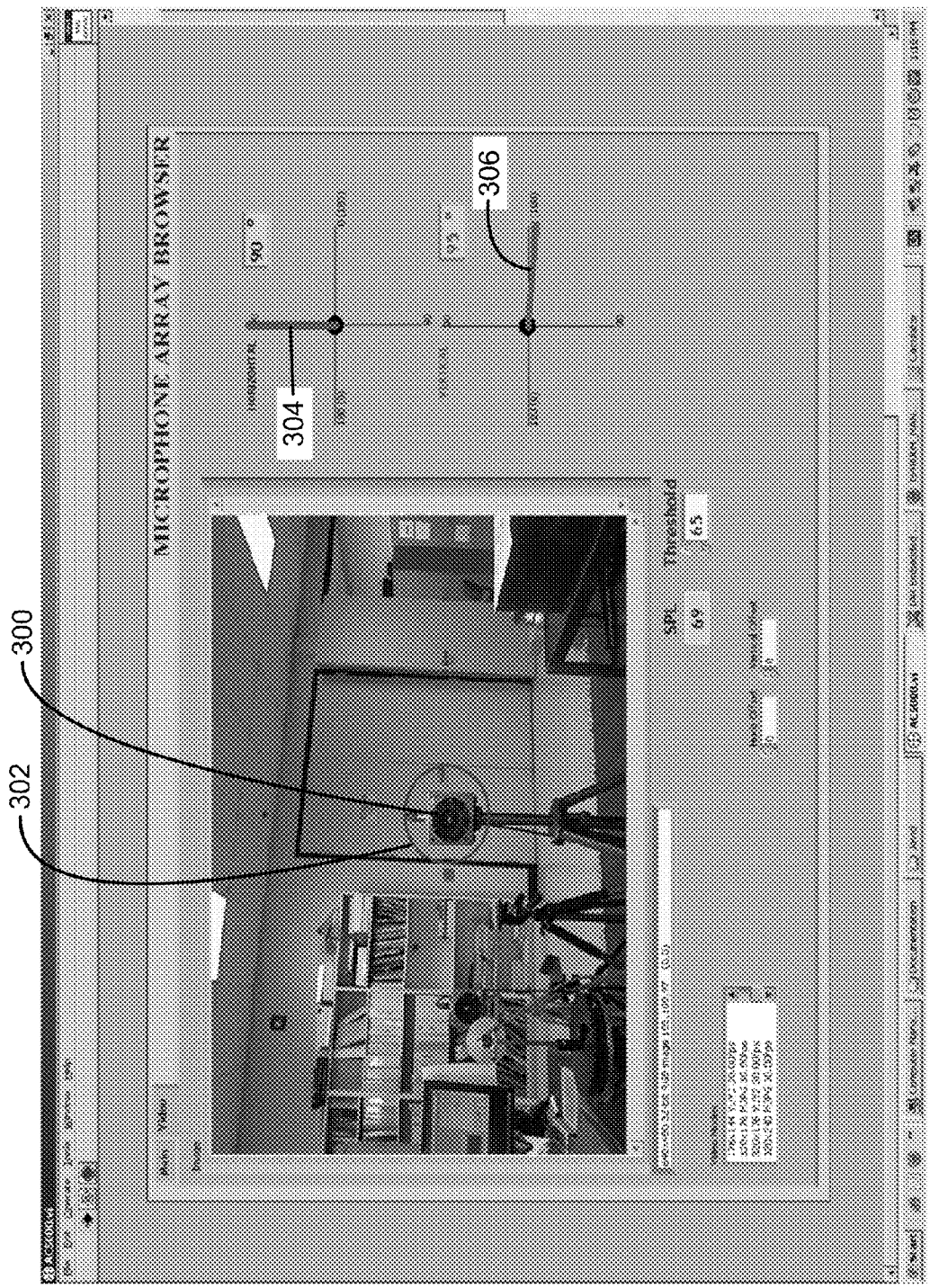
FIG. 10 is an exemplary embodiment of a laboratory ultrasonic source located using two beamforming arrays of FIG. 1 and with the located laboratory ultrasonic source position overlaid on a visible image.

To better communicate in a visual, practical and quantitative manner the direction, location and size of the gas leak to the user, another embodiment displays such information by overlaying the visual information on an image display, e.g. display 430 (FIG. 10). The user can thus see a representation of the actual location of the gas leak, along with SPL values, superimposed pictorially over the image of the equipment that is likely the source of the gas leak producing the intense ultrasonic energy detectable several meters away. Such a visual image also has the advantage that a known friendly gas leak, such as pressurized air release for maintenance purposes, could be zoned out by the user. An increase in ultrasound noise generated by machinery could also be easily monitored while at the same time discriminating such ultrasonic nuisance from real gas leaks using techniques such as the ANN described earlier. Further benefits include the recording and playback of ultrasonically overlaid images of events that caused alarms (or false alarms) including highlighting of equipment malfunction, time evolution of the event, and security aspects of the industrial facility. Such ultrasonically overlaid images could be continuously monitored via a webcam or on an internal security camera network.

Implementation of ultrasonic energy overlay on a visible image for industrial applications in hazardous environments typically involves arrays of low cost MEMS microphones, analog and digital electronics in enclosures suitable for hazardous locations, and an industrial imager. Such ultrasonic imaging of real world gas leaks, both combustible and toxic, provides great benefits for fixed gas detection installations over conventional point and open path gas detectors as well as over infrared gas imaging solutions. Infrared gas cloud imaging cameras are expensive, their sensitivity varies greatly with the gas being monitored, and their performance depends greatly on the differential between the leaking gas cloud temperature and background temperature.

The ultrasonic gas leak detection solutions described above do not suffer from many of the drawbacks associated with infrared gas cloud imaging. Ultrasonic gas leak detection, localization and imaging is particularly suited to exemplary applications in which the leaking gas is under pressure (regardless of whether it is flammable, toxic, or inert), and that the gas leak be at a distance of at most tens of meters, typically less than 30 meters. Under such conditions, pressurized gas leaks of a large number of hydrocarbon gases, toxic gases and even inert gases such as helium can be easily detected using ultrasonic gas leak detectors. Highly flammable gases such as hydrogen that cannot be detected by optical or infrared means can be easily detected using ultrasonic gas leak detectors, while leak location information may be presented using beamforming arrays with the ultrasonic overlay on the visible imaging solution described above.

FIG. 10 depicts a screen snapshot of an acoustic source 300 generating ultrasound; the acoustic source is placed in the middle of a visible camera image displayed using LabVIEW from National Instruments The circle 302 is the vector position of the sound source as calculated by the Time-Delay-and-Sum beamformer 100 described above and overlaid on the visible image. If the acoustic source is moved to a different location, the circle will follow the acoustic source. The pointers 304, 306 indicate the horizontal and vertical angular coordinates of the sound source. The horizontal direction is 90 degrees, and therefore on the MEMS microphone array axis. The vertical direction is 95 degrees, and therefore 5 degrees below the MEMS microphone array axis. The SPL measured is shown as 69 dB and is greater than the threshold set to 65 dB. Triangulation using a second microphone array provides for location coordinates as described earlier, for example $X_1$ and the angle $\alpha$ referenced to the first microphone array. The first microphone array is used for monitoring the SPL and may be considered the primary microphone array gas leak detector, while the second microphone array gas leak detector helps compute the exact location of the ultrasound source or gas leak. In an exemplary embodiment, the system is configured to locate the source in three dimensions only when the SPL of the received ultrasonic energy at the primary microphone array exceeds a threshold value In a further embodiment, the magnitude of ultrasound measured by a beamformer for each scan angle direction could be overlaid over the corresponding visible image pixels providing a continuous ultrasonic map of the scene under observation. For an exemplary embodiment, for each of the 72 azimuth scan angle directions there are also 72 elevation scan angle directions resulting in a matrix of 72 by 72 scan angle directions with a beamformer calculated ultrasound magnitude for each of the 72 by 72 directions totaling, in this example, 5184 directions. These ultrasound magnitudes can be superimposed over the corresponding visible image pixel areas, for example, using a color coded scheme as is done for temperature measurements with thermal imagers. Alternatively, the ultrasound magnitudes in numerical form at each position could be displayed in overlay fashion onto the image of the scene under observation. For any object of interest in the scene that emits sufficient ultrasound, a second beamforming microphone array could be used to triangulate the object's position.

Figure 11:
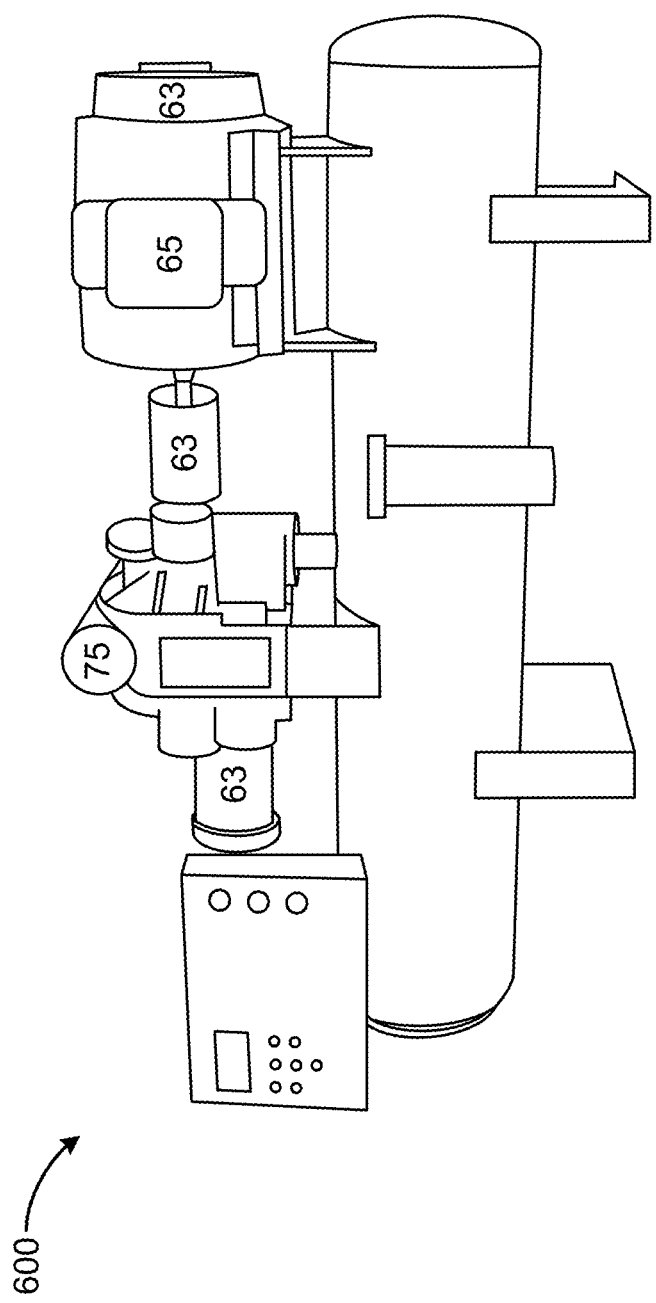
FIG. 11 diagrammatically depicts a display image representing a surveilled scene, using two microphone array gas leak detectors of FIG. 4A or FIG. 4B, in which the first microphone array gas leak detector has a field of view centered on an equipment.

FIG. 11 diagrammatically depicts a display representing a surveilled scene, in which the microphone array gas leak detector of FIG. 4A or FIG. 4B has a field of view centered on equipment 600, such as, for example, a compressor, in a hazardous location. The beamforming array generates signals indicative of the ultrasonic SPL generated by different parts of the equipment. Parts of the equipment in this example generate more intense ultrasonic SPL than others, resulting in local maxima or peaks as the beamformer continuously scans in the azimuth and elevation directions. FIG. 11 shows several peak magnitudes measured by the beamformer as it continuously scans in the azimuth and elevation directions. The computed SPL magnitudes are overlaid onto the image of the surveilled scene; in the exemplary embodiment of FIG. 11 only SPL values greater than or equal to a threshold of 63 dB are shown in the display. The continuously scanning beamforming array is thus able to monitor the compressor, and provide an intensity map of the ultrasonic emissions from different parts of the compressor. For any part of the equipment 600 in the scene that emits sufficient ultrasound, a second beamforming microphone array could be used to triangulate the object's position. In normal operation such equipment 600 would create normal operating ultrasound as a machine. As described in FIG. 6 and FIG. 7, an artificial neural network (ANN) 222 operating in DSP 150 (FIG. 5) would continuously monitor the received ultrasound in case it is created by a compressed gas leak rather than normal machine operation.

Although the foregoing has been a description and illustration of specific embodiments of the subject matter, various modifications and changes thereto can be made by persons skilled in the art without departing from the scope and spirit of the invention.

What is claimed is:

1. An ultrasonic gas leak detector system for locating a source of ultrasonic airborne energy, comprising:
a plurality of spatially separated ultrasonic gas leak detectors, each configured to generate electrical signals indicative of detected angles of arrival of received ultrasonic energy at the respective detectors;
wherein each of the plurality of spatially separated ultrasonic gas leak detectors comprises a two-dimensional array of spaced microphones, each microphone responsive to incident airborne ultrasonic energy from gas leak sources disposed within range of the array to generate a microphone signal, and the array of each detector is mounted in a housing structure separate from the housing structures of each other detector;
a locator processor connected to the plurality of detectors for receiving the electrical signals generated by the detectors, the locator processor configured to process the electrical signals from the plurality of detectors to determine a location in three dimensions of the source of the ultrasonic energy received at the detectors and provide locator processor output signals indicative of the location of the ultrasonic energy source.

2. The system of claim 1, wherein each microphone is a MEMS microphone.

3. The system of claim 2, wherein each of the plurality of spatially separated ultrasonic gas leak detectors comprises:
a beamforming processor responsive to the microphone signals from the array of MEMS microphones to generate the electrical signals which are indicative of estimated angles of arrival of ultrasonic energy incident on the array from the gas leak sources within range of the array.

4. The system of claim 3, wherein each array is a two dimensional planar array, and the microphones of the array are spaced uniformly and equally in two orthogonal directions to form at least two linear arrays.

5. The system of claim 3, wherein the beamforming processor is configured to perform time-delay-and-sum beamforming on the array signals.

6. The system of claim 3, wherein the beamforming processor is responsive to the microphone signals from the array of MEMS microphones to process a plurality of beam directions, and to generate processor output signals indicative of an estimated angle of arrival of ultrasonic energy incident on the array at one of the beam directions generating the largest response.

7. The system of claim 3, wherein each detector further comprises an artificial neural network (ANN) configured to discriminate ultrasound generated by pressurized gas leaks from nuisance ultrasound.

8. The system of claim 1, wherein the locator processor is configured to indicate an estimated location of the ultrasonic energy only when a measured sound pressure level of the incident ultrasonic energy at one or more of the detectors exceeds a threshold value.

9. The system of claim 1, further comprising:
a display for displaying an image of a scene surveilled by the system, including equipment through which gas is passed or stored;
the display responsive to the locator processor output signals to depict a location and/or intensity of a gas leak source superimposed on the image.

10. The system of claim 1, wherein the locator processor is configured to determine the location by triangulation of the signals from the plurality of detectors.

11. An ultrasonic gas leak locator system, comprising:
a plurality of spatially separated ultrasonic gas leak detectors, each configured to generate detector signals indicative of detected angles of arrival of received airborne ultrasonic energy at the respective detectors;
wherein each of the plurality of spatially separated ultrasonic gas leak detectors comprises a two-dimensional array of spaced MEMS microphones, each microphone responsive to incident airborne ultrasonic energy from gas leak sources disposed within range of the array to generate a microphone signal, and the array of each detector is mounted in a housing structure separate from the housing structures of each other detector;
a locator processor configured to receive the detector signals generated by the plurality of detectors, the locator processor configured to process the signals from the plurality of detectors by triangulation using the detected angles of arrival and position data for each of the plurality of detectors to determine a location in three dimensions of the source of the ultrasonic energy received at the detectors and provide locator processor output signals indicative of the location of the ultrasonic energy source.

12. The system of claim 11, wherein each of the plurality of spatially separated ultrasonic gas leak detectors comprises:

a beamforming processor responsive to the microphone signals from the array of MEMS microphones to generate signals which are indicative of estimated angles of arrival of ultrasonic energy incident on the array from the gas leak sources within range of the array.

13. The system of claim 12, wherein each array is a planar two dimensional array, and the microphones of the array are spaced uniformly and equally in two orthogonal directions to form at least two linear arrays.

14. The system of claim 12, wherein the beamforming processor is responsive to the microphone signals from the array of MEMS microphones to process a plurality of beam directions, and to generate processor output signals indicative of an estimated angle of arrival of ultrasonic energy incident on the array at one of the beam directions generating the largest response.

15. The system of claim 12, wherein each detector further comprises an artificial neural network (ANN) configured to discriminate ultrasound generated by pressurized gas leaks from nuisance ultrasound.

16. The system of claim 11, wherein the locator processor is configured to indicate an estimated location of the ultrasonic energy source only when a measured sound pressure level of the incident ultrasonic energy at one or more of the detectors exceeds a threshold value.

17. A directional ultrasonic gas leak locator system, comprising:
a plurality of ultrasonic gas leak detectors, each detector including a two-dimensional planar array of spaced MEMS microphones, each microphone responsive to incident airborne ultrasonic energy from gas leak sources to generate a microphone signal;
a beamforming processor for each array, responsive to the microphone signals from the array to generate beamforming processor output signals indicative of estimated angles of arrival of ultrasonic energy incident on the array;
the detectors arranged in a spatially separated configuration to surveil an area containing pressurized gas storage or transportation structures;
a locator processor responsive to the beamforming processor output signals and configured to triangulate and locate in three dimensions the position of a pressurized gas leak.

18. The system of claim 17, further comprising:
a display responsive to a locator processor output signal to generate an image representative of the surveilled area with the calculated position of the pressurized gas leak overlaid onto the image.

* * * * *